US012149459B2

(12) United States Patent
Yao et al.

(10) Patent No.: US 12,149,459 B2
(45) Date of Patent: Nov. 19, 2024

(54) TECHNOLOGIES FOR RELIABLE PHYSICAL DATA CHANNEL RECEPTION IN WIRELESS COMMUNICATIONS

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haijing Hu, Beijing (CN); Haitong Sun, Irvine, CA (US); Hong He, Cupertino, CA (US); Huaning Niu, San Jose, CA (US); Oghenekome Oteri, San Diego, CA (US); Sigen Ye, Whitehouse Station, NJ (US); Wei Zeng, San Diego, CA (US); Weidong Yang, San Diego, CA (US); Yuqin Chen, Shenzhen (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 17/438,556

(22) PCT Filed: Oct. 15, 2020

(86) PCT No.: PCT/CN2020/121201
§ 371 (c)(1),
(2) Date: Sep. 13, 2021

(87) PCT Pub. No.: WO2022/077352
PCT Pub. Date: Apr. 21, 2022

(65) Prior Publication Data
US 2022/0303073 A1    Sep. 22, 2022

(51) Int. Cl.
*H04W 4/00*    (2018.01)
*H04L 1/08*    (2006.01)
(Continued)

(52) U.S. Cl.
CPC .............. *H04L 5/0012* (2013.01); *H04L 1/08* (2013.01); *H04L 5/0051* (2013.01); *H04W 4/06* (2013.01);
(Continued)

(58) Field of Classification Search
None
See application file for complete search history.

(56) References Cited

U.S. PATENT DOCUMENTS

2016/0218788 A1\*   7/2016  Yum ..................... H04L 1/1812
2019/0288757 A1\*   9/2019  Zhou .................... H04B 7/024
(Continued)

FOREIGN PATENT DOCUMENTS

CN         111602365 A        8/2020

OTHER PUBLICATIONS

International Search Report for PCT Patent Application No. PCT/CN2020/121201; mailed Jul. 21, 2021.
(Continued)

*Primary Examiner* — Abdelillah Elmejjarmi
(74) *Attorney, Agent, or Firm* — Kowert, Hood, Munyon, Rankin & Goetzel, P.C.

(57) ABSTRACT

Improved solutions for reliable physical channel, e.g. Physical Downlink Shared Channel (PDSCH) reception during wireless communications, for example during 3GPP New Radio (NR) communications include continuous channel repetitions that cross slot boundaries, channel repetitions with multiple frequency hops, and joint-repetition channel estimation that uses demodulation reference signals from at least two channel repetitions for the channel estimation. In one aspect, reliable PDSCH reception may have the benefit of aiding target UEs and serving base stations in implementing reliable Multicast and Broadcast Services (MBS).

17 Claims, 10 Drawing Sheets

(51) Int. Cl.
  *H04L 5/00* (2006.01)
  *H04W 4/06* (2009.01)
  *H04W 72/0446* (2023.01)
  *H04W 72/0453* (2023.01)
  *H04W 72/23* (2023.01)

(52) U.S. Cl.
  CPC ... *H04W 72/0446* (2013.01); *H04W 72/0453* (2013.01); *H04W 72/23* (2023.01)

(56) References Cited

U.S. PATENT DOCUMENTS

| | | | |
|---|---|---|---|
| 2019/0313442 | A1 | 10/2019 | Hosseini et al. |
| 2019/0349137 | A1 | 11/2019 | Hosseini et al. |
| 2020/0267756 | A1 | 8/2020 | Fakoorian et al. |
| 2020/0314842 | A1* | 10/2020 | Bhattad ............. H04W 74/0808 |
| 2021/0014834 | A1* | 1/2021 | Akkarakaran ........ H04L 5/0082 |
| 2021/0051652 | A1* | 2/2021 | Khoshnevisan ...... H04L 1/1896 |
| 2021/0360664 | A1* | 11/2021 | Fakoorian ......... H04W 72/1273 |
| 2023/0072427 | A1* | 3/2023 | Jung .................... H04B 7/0617 |
| 2023/0111395 | A1* | 4/2023 | Li ............................. H04L 5/14 370/329 |
| 2023/0140213 | A1* | 5/2023 | Awadin ................. H04L 5/0044 370/329 |
| 2023/0179348 | A1* | 6/2023 | Seok .................... H04L 5/0092 370/280 |

OTHER PUBLICATIONS

Vivo "Support of long-PUCCH over multiple slots" 3GPP TSG RAN WG1 Meeting 91 R1-1719790; Reno, USA; Dec. 1, 2017.
Garro et al. "5G Mixed Mode: NR Multicast-Broadcast Services"; IEEE Transactions on Broadcasting; Mar. 2020.

* cited by examiner

FIG. 6

TECHNOLOGIES FOR RELIABLE PHYSICAL DATA CHANNEL RECEPTION IN WIRELESS COMMUNICATIONS

PRIORITY CLAIM INFORMATION

This application is a national stage application of International Application No. PCT/CN2020/121201, filed on Oct. 15, 2020, titled "Technologies for Reliable Physical Data Channel Reception in Wireless Communications", which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, including technologies for reliable physical data channel (e.g. Physical Downlink Shared Channel) reception during wireless communications, e.g. during 3GPP NR communications.

BACKGROUND

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A proposed telecommunications standard moving beyond the International Mobile Telecommunications-Advanced (IMT-Advanced) Standards is 5th generation mobile networks or 5th generation wireless systems, referred to as 3GPP NR (otherwise known as G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of cellular communication systems involves physical control and data channel reception. Improvements in the field are desired.

Aspects are presented herein of, inter alia, of technologies for implementing solutions for reliable physical channel, e.g. Physical Downlink Shared Channel (PDSCH) reception during wireless communications, for example during 3GPP New Radio (NR) communications. Aspects are further presented herein for wireless communication systems containing user equipment (UE) devices and/or base stations communicating with each other within the wireless communication systems as proposed herein to implement reliable physical channel reception, for example to implement reliable physical data channel (such as PDSCH) reception. In one aspect, reliable PDSCH reception may have the benefit of aiding target UEs and serving base stations in implementing reliable Multicast and Broadcast Services (MBS) or Multimedia Broadcast and Multicast Services (MBMS). In some aspects, reliable physical channel reception, including PDSCH reception, may be achieved through various methods of channel transmission/reception repetition, frequency hopping, and channel estimation as disclosed herein.

Pursuant to the above, a device, e.g. a UE, may receive multiple repetitions of a physical channel. e.g. a physical downlink shared channel (PDSCH), with at least a first repetition being of a specified type of repetition that is continuous across a slot boundary between a first slot and a second slot in which the first repetition is received. The UE may indicate, to a base station, prior to receiving the multiple repetitions, that the UE is capable of receiving repetitions of the specified type. In some aspects, the UE may receive at least a second repetition in a slot that includes invalid symbols not available for repetitions, with the second repetition split by the invalid symbols while remaining of a same length as other repetitions. In other words, the repetition may not use the invalid symbols in the slot but may still remain of the same length as the other repetitions. Accordingly, the repetition may not be continuous across all the symbols it uses in that slot but may still be received using the valid symbols in the slot while remaining of the same length as the other repetitions. The invalid symbols may include, but are not limited to, symbols that overlap with synchronization signal block transmissions, symbols used for a physical downlink control channel, guard period symbols, uplink symbols, symbols in a time division duplex uplink slot, and/or symbols indicated as uplink symbols or guard period symbols by a slot format indicator.

The base station may indicate to the UE that the repetitions are of the specified type, prior to transmitting the repetitions. The indication may be transmitted over radio resource control signaling, or in a specially allocated field in a downlink control indication, or in a time domain resource allocation field in the downlink control indication, or in a media access control (MAC) control element. In addition, the UE may receive each repetition of a subset of the repetitions in a different respective frequency domain location. A first respective frequency domain location may be specified according to an indication in a frequency domain resource allocation (FDRA) field, and the remaining frequency domain locations may be specified according to corresponding offsets added to the first respective frequency domain location.

In some aspects, the UE may receive more than one repetition of the subset of the repetitions within a single slot. Furthermore, the UE may perform joint-repetition channel estimation using reference signals from at least two different repetitions for the channel estimation. The UE may provide, to a base station prior to performing the channel estimation, an indication that the UE is capable of performing joint-repetition channel estimation for the channel estimation. The UE may perform the channel estimation responsive to the base station enabling joint-repetition channel estimation in response to receiving the indication from the UE. Furthermore, the UE may perform the channel estimation based on a channel-estimation window, which may be defined according to the number of repetitions and may be provided to the UE by the base station.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 6 shows an exemplary diagram illustrating group-common PDSCH repetition type B, according to some aspects;

Figure 1:
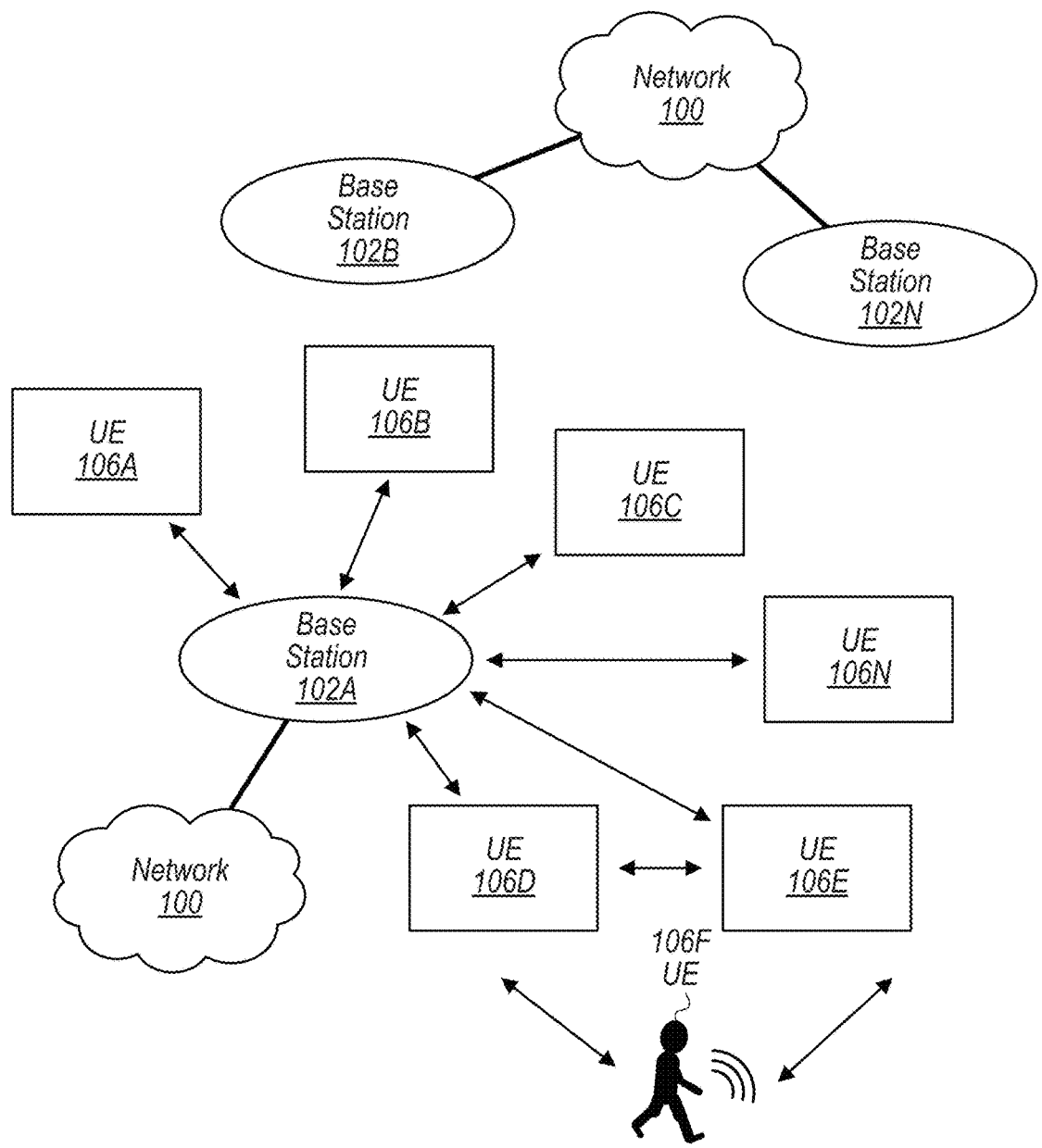
FIG. 1 illustrates an exemplary (and simplified) wireless communication system, according to some aspects.

While features described herein are susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

ACK: Acknowledge
AMF: Access Mobility and Management Function
APR: Applications Processor
AUL: Autonomous Uplink Transmission
BLER: Block Error Rate
BS: Base Station
BSR: Buffer Status Report
BWP: Bandwidth Part
CAPC: Channel Access Priority Class
CG: Configured Grant
CMR: Change Mode Request
CORESET: Control Channel Resource Set
COT: Channel Occupancy Time
CRC: Cyclic Redundancy Check
CS-RNTI: Configured Scheduling Radio Network Temporary Identifier
CSI: Channel State Information
DCI: Downlink Control Information
DG: Dynamic Grant
DL: Downlink (from BS to UE)
DMRS: Demodulation Reference Signal
DYN: Dynamic
ED: Energy Detection
FDM: Frequency Division Multiplexing
FT: Frame Type
GC-PDCCH: Group Common Physical Downlink Control Channel
GPRS: General Packet Radio Service
GSM: Global System for Mobile Communication
GTP: GPRS Tunneling Protocol
HARQ: Hybrid Automatic Repeat Request
IR: Initialization and Refresh state
LAN: Local Area Network
LMF: Location Management Function
LPP: LTE Positioning Protocol
LTE: Long Term Evolution
MAC: Media Access Control
MAC-CE: MAC Control Element
MCS: Modulation and Coding Scheme
MIB: Master Information Block
MIMO: Multiple-in Multiple-Out
NDI: New Data Indication
OFDM: Orthogonal Frequency Division Multiplexing
OSI: Open System Interconnection
PBCH: Physical Broadcast Channel
PDCCH: Physical Downlink Control Channel
PDCP: Packet Data Convergence Protocol
PDN: Packet Data Network
PDSCH: Physical Downlink Shared Channel
PDU: Protocol Data Unit
PRB: Physical Resource Block
PUCCH: Physical Uplink Control Channel
PUSCH: Physical Uplink Shared (data) Channel
QCL: Quasi Co-Location
RACH: Random Access Procedure
RAT: Radio Access Technology
RB: Resource Block
RE: Resource Element
RF: Radio Frequency
RMSI: Remaining Minimum System Information RNTI: Radio Network Temporary Identifier
ROHC: Robust Header Compression
RRC: Radio Resource Control
RS: Reference Signal (Symbol)
RSI: Root Sequence Indicator
RTP: Real-time Transport Protocol
RV: Redundancy Version
RX: Reception/Receive
SDM: Spatial Division Multiplexing
SID: System Identification Number
SGW: Serving Gateway
SR: Scheduling Request
SRS: Sounding Reference Signal
SS: Search Space
SSB: Synchronization Signal Block
TBS: Transport Block Size
TCI: Transmission Configuration Indication
TDM: Time Division Multiplexing
TRS: Tracking Reference Signal
TX: Transmission/Transmit
UCI: Uplink Control Information
UE: User Equipment
UL: Uplink (from UE to BS)
UNITS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices) FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE. CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
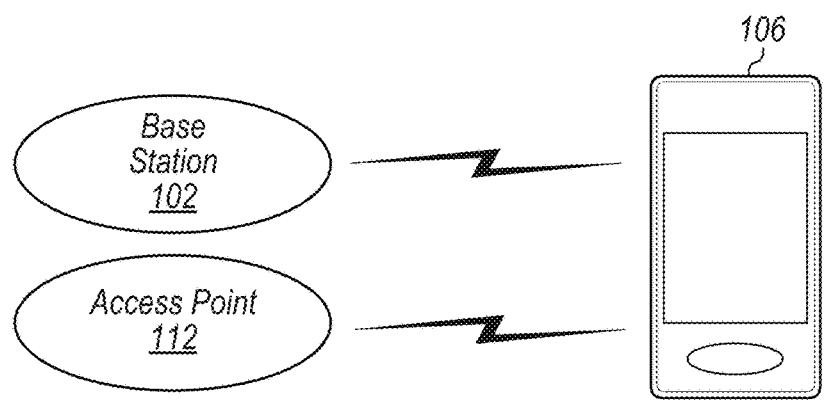
FIG. 2 illustrates an exemplary base station in communication with an exemplary wireless user equipment (UE) device, according to some aspects.

FIGS. 1 and 2—Exemplary Communication Systems

3GPP LTE/NR defines a number of downlink (DL) physical channels, categorized as transport or control channels, to carry information blocks received from the MAC and higher layers. 3GPP LTE/NR also defines physical layer channels for the uplink (UL). The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information (DCI) message. For example, the DCI may include a transmission configuration indication (TCI) relating to beamforming, with the TC including configurations such as quasi-co-located (QCL) relationships between the downlink reference signals (DL-RSs) in one Channel State Information RS (CSI-RS) set and the PDSCH Demodulation Reference Signal (DMRS) ports. Each TCI state can contain parameters for configuring a QCL relationship between one or two downlink reference signals and the DMRS ports of the PDSCH, the DMRS port of PDCCH or the CSI-RS port(s) of a CSI-RS resource. Multiple PDCCHs can be transmitted in the same subframe using Control Channel Elements (CCE), each of which is a set of resource elements known as Resource Element Groups (REG). The PDCCH can employ quadrature phase-shift keying (QPSK) modulation, with a specified number (e.g. four) of QPSK symbols mapped to each REG. Furthermore, a specified number (e.g. 1, 2, 4, or 8) of CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the base station (e.g. eNB or gNB). The base station uses the uplink scheduling grant (e.g. in DCI) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

FIG. 1 illustrates an exemplary (and simplified) wireless communication system, according to some aspects. It is noted that the system of FIG. 1 is merely one example of a possible system, and aspects may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may implement solutions for reliable physical channel, e.g. Physical Downlink Shared Channel (PDSCH) reception, as disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in a carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station(s) 102 are implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some aspects, the base station(s) 102 may implement signaling for provisioning positioning-resources requested via physical layer signaling by UEs, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/aspects under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-102N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE(s) 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UEs 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UE(s) 106, e.g. 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Further aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some aspects. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the methods described herein by executing such stored instructions. Alternatively, or in addition, the UE 106 may include a programmable hardware element such as an FPGA (field-programmable gate array) that is configured to perform any of the methods described herein, or any portion of any of the methods described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some aspects, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
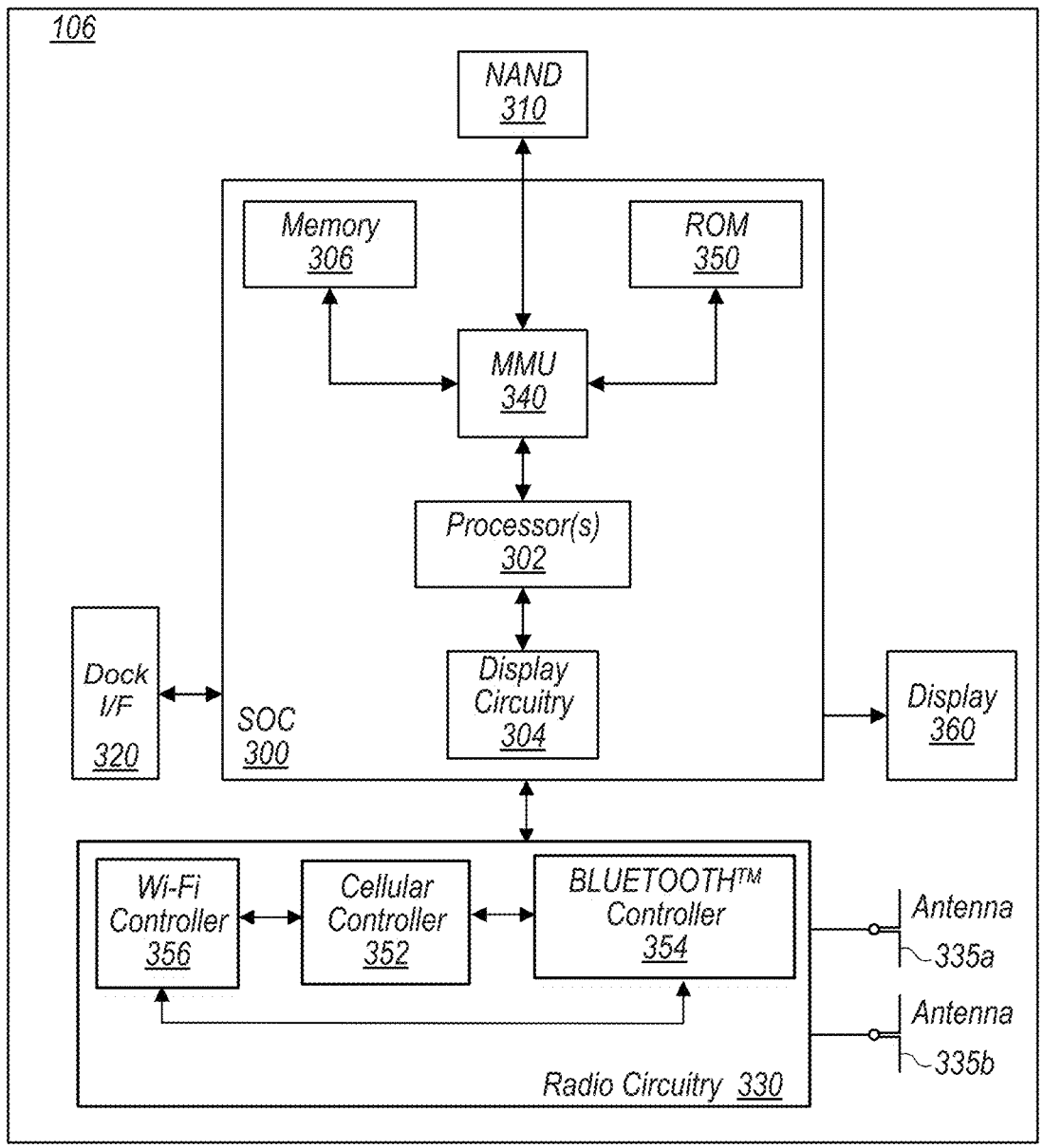
FIG. 3 illustrates an exemplary block diagram of a UE, according to some aspects.

FIG. 3—Block Diagram of an Exemplary UE

FIG. 3 illustrates a block diagram of an exemplary UE 106, according to some aspects. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM)350, NAND flash memory 310) and/or to other circuits or devices, such as the display circuitry 304, radio circuitry 330, connector I/F 320, and/or display 360. The MMU 340 may be configured to perform memory protection and page table translation or set up. In some aspects, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some aspects.

As further described herein, the UE 106 (and/or base station(s) 102) may include hardware and software components for operating using control signaling that enhances the reliability of physical control channel (e.g. PDSCH) transmission and reception, as further detailed herein. The processor(s) 302 of the UE device 106 may be configured to implement part or all of the methods described herein, e.g., by executing program instructions stored on a memory medium (e.g., a non-transitory computer-readable memory medium). In other aspects, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement reliable physical channel reception, for example to implement reliable physical data channel (such as PDSCH) reception according to various aspects disclosed herein. Processor(s) 302 may also implement various other applications and/or end-user applications running on UE 106.

Figure 5:
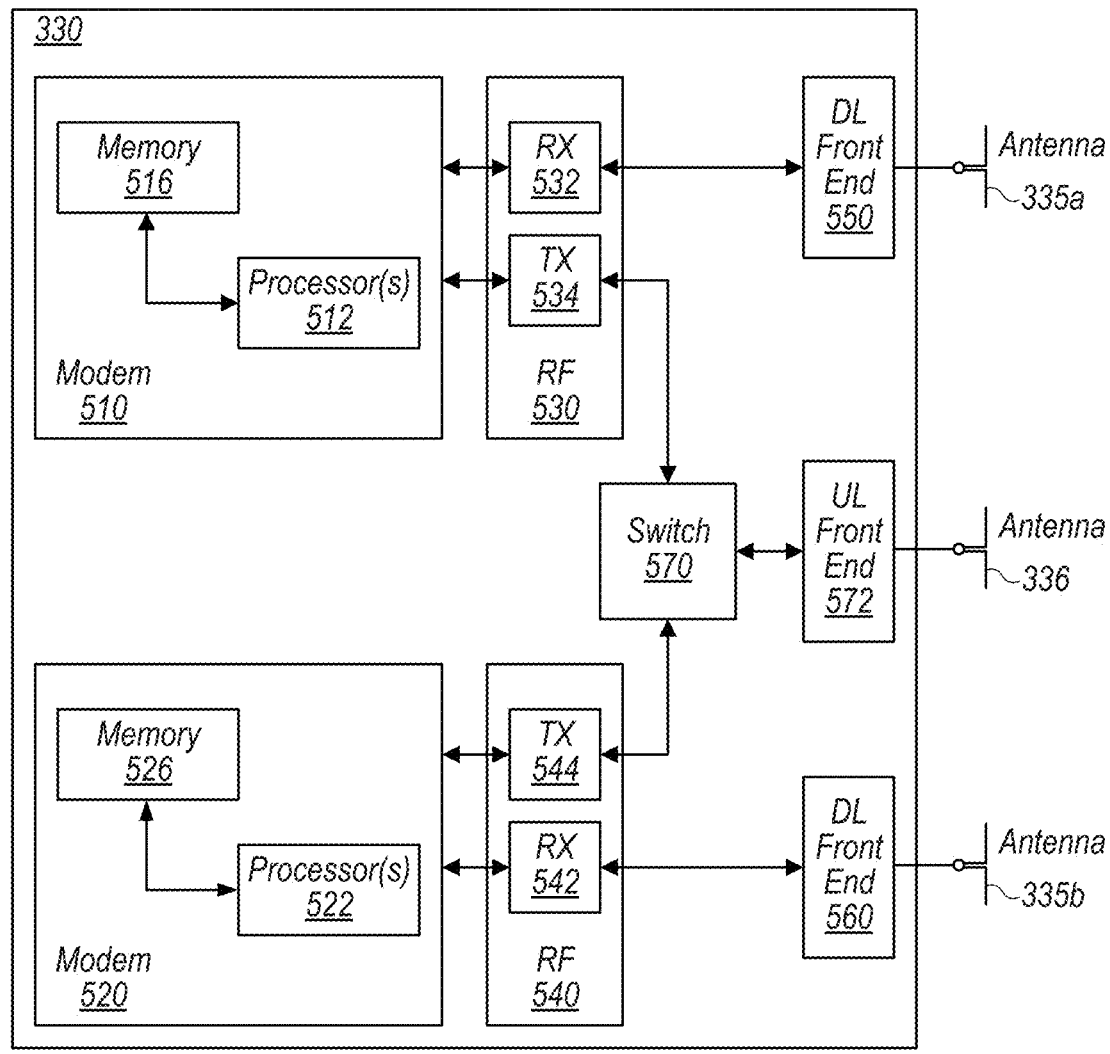
FIG. 5 shows an exemplary simplified block diagram illustrative of cellular communication circuitry, according to some aspects.

In some aspects, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some aspects, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other aspects have fewer or more similar controllers for various different RATs that may be implemented in UE device 106. For example, at least one exemplary block diagram illustrative of some aspects of cellular controller 352 is shown in FIG. 5 and will be further described below.

Figure 4:
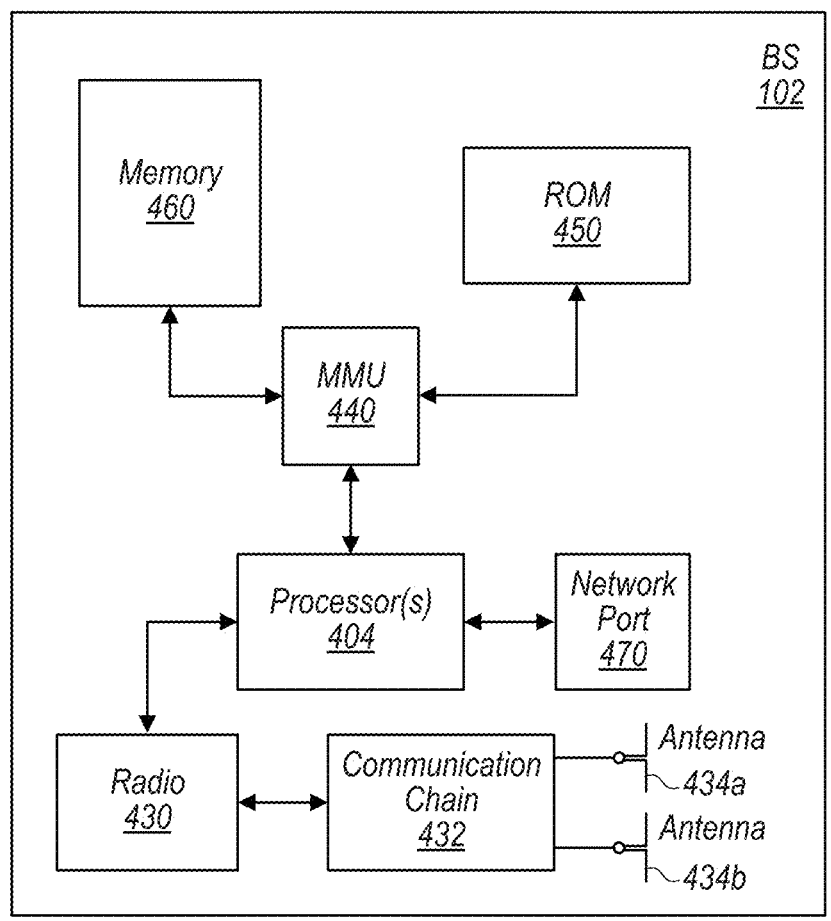
FIG. 4 illustrates an exemplary block diagram of a base station, according to some aspects.

FIG. 4 —Block Diagram of an Exemplary Base Station

FIG. 4 illustrates a block diagram of an exemplary base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna(s) 434. Antenna(s) 434 may be configured to operate as a wireless transceiver and may be further configured to communicate with UE devices 106 via radio circuitry 430. The antenna(s) 434 may communicate with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to implement signaling for provisioning positioning-resources requested via physical layer signaling by UEs, as disclosed herein. Alternatively, the processor(s)404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and aspects thereof as disclosed herein to implement reliable physical channel reception, for example to implement reliable physical data channel (such as PDSCH) reception.

FIG. 5—Block Diagram of Exemplary Cellular Communication Circuitry

FIG. 5 illustrates an exemplary simplified block diagram illustrative of cellular controller 352, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some aspects, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. U L front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some aspects, the cellular communication circuitry 352 may also not include the switch 570, and the RF front end 530 or the RF front end 540 may be in communication, e.g., directly, with the UL front end 572.

Physical Channel Reception Reliability and Transmission/Reception Repetition

Multicast and Broadcast Services (MBS) or Multimedia Broadcast and Multicast Services (MBMS) refers to a point-to-multipoint communication scheme in which data packets are simultaneously transmitted from a single source to multiple destinations. Broadcast refers to content delivery to all users, while multicast refers to content distribution among a specific group of users subscribed to a given multicast service. The geographical area over which multicast and broadcast content is transmitted is referred to as a zone. An MBS zone is typically a collection of one or more base stations transmitting the same content, and each MBS-service-capable base station may belong to one or more MBS zones, each MBS zone identified by a unique zone identifier. A mobile station (or UE) can receive MBS content within an MBS zone when the UE is in connected state (e.g. RRC connected mode). UEs in an MBS zone are typically assigned a common multicast station identifier.

PDSCH reception reliability is important from a systems perspective, especially for URLLC (Ultra-reliable and Low Latency Communication) service, in addition to being important as a new work item (WI) related to Multicast and Broadcast Services (MBS) in the development of the 3GPP standard for NR. One of the objectives is to specify basic RAN functions for broadcast/multicast for UEs in a radio resource control (RRC) connected state, and to specify required changes to improve reliability of MBS, e.g. by UL feedback. The level of reliability may be determined by or may be based on the requirements of the provided application/service. A number of related agreements regarding these and other issues have already been reached. One agreement includes support for at least slot-level repetition for group-common physical downlink control channel (PDSCH) for RRC-connected UEs. Further studies are expected regarding additional enhancements.

One example of MBS transmission is referred to as Single Cell Peer-To-Multiple-peer or Single Cell Point-To-Multipoint (SCPTM), which is a type of a radio access method dedicated to multicast through the PDSCH in a single cell. In one sense SCPTO may be regarded as a combination of PDSCH and evolved MBMS (eMBMS). For an SCPTM transmission, UEs in a group receive the group data through a common radio resource region in the PDSCH. In general, the MBS may serve a group of UEs to save the system resources, and MBS reception reliability is important in achieving this target. Oftentimes, increased reliability may require additional resources, which gives rise to various issues.

A first issue is related to the slot-level repetition, which has been supported since Rel.15/16, but has some limitations. One notable limitation is that downlink (DL) symbols in a certain slot, referred to as a special slot (e.g. the downlink-to-uplink-switching slot, UL-to-DL-switching slot, in Time Division Duplexing) cannot be used for repetition. The special slot may include some DL symbols, some UL symbols, and also gaps. The starting and ending symbols of the repetition are always fixed. For example, if the repetition starts from symbol #4 to symbol #10, then the same resources (7 symbols) are always used by every slot for this repetition. Other symbols cannot be used for this repetition.

A second issue is that the defined PDSCH frequency hopping scheme is on the slot level. If there are several PDSCH repetitions in a slot, consideration needs to be given to how frequency hopping may be performed such that a desired frequency diversity gain is obtained. Accordingly, further enhancements for PDSCH reception reliability are needed.

Channel Repetition

Various PDSCH repetition enhancements may be applicable to MBS and also to at least unicast PDSCH. For example, by enhancing the channel (e.g. PDSCH) repetition, channel reception reliability and MBS coverage may be increased. A group-common PDSCH is scheduled for a group of users to receive the same MBS service. The currently (or already) supported slot-level PDSCH repetition (e.g. as defined in the legacy release) is referred to herein as repetition type A, e.g. PDSCH repetition type A (more generally, channel repetition of a first type), while a new proposed repetition scheme is referred to herein as repetition type B, e.g. PDSCH repetition type B (more generally, channel repetition of a second type).

Pursuant to the above, in some aspects, a group-common PDSCH repetition type B may be implemented as a PDSCH repetition that is continuous and crosses the slot boundary. More generally, a channel repetition of a second type is proposed, representing a channel repetition that is continuous and may cross the slot boundary. The repetition may thus remain a single continuous repetition across the slot boundary. The UE may report to the base station whether the UE has the capability to support PDSCH repetition type B (or more generally to support repetitions of the second type). The base station may determine based on this indication whether to schedule repetitions of the second type to the UE. Accordingly, in some aspect, a repetition type B may be applied to a PDSCH mapping type B, with the DMRS located in the first symbol of the PDSCH. Currently, a PDSCH mapping type B supports the length of PDSCH in the symbol range of {2 . . . 13}. In some aspects, the length of the PDSCH mapping type B may be extended to 14 symbols for at least group-common PDSCHs.

Because the repetition of the second type is continuous and may cross slot boundaries, the repetition may cross the slot boundary of a special slot, e.g. a slot which includes both DL and UL symbols. However, not all symbols may be available for the repetition in such a special slot. That is to say, in special slots some symbols may be considered invalid symbols for repetition. For example, UL symbols may not be available for DL retransmission/repetition. Accordingly, a validation rule may be defined to provide an indication of symbols that are not valid for repetition, i.e. they are not valid for use in repetition. According to some aspects, the following symbols may be defined as invalid for repetitions that are continuous across slot boundaries:

Symbols that overlap with Synchronization Signal Block (SSB) transmission;
Symbols used for PDCCH;
Guard Period (GP) symbol or UL symbols in the special slot of TDD;
Symbols in the TDD UL slot; and
Symbols indicated as UL or GP symbols via Slot Format Indicator (SFI).

In case some of the symbols are not valid for repetition, the UE may skip the invalid symbols while still keeping the length of the repetition the same as other repetitions. The repetition may still cross the slot boundary and remain of the same length as other repetitions, e.g. repetitions for which invalid symbols are not an issue. Optionally, the repetition may be divided by the invalid symbols and may be split across slot boundaries, with the transmission block (TB) transmitted in each repetition.

PDSCH repetition type B, or repetition of the second type may be enabled in different ways. In some aspects, RRC signaling may be used to indicate whether the PDSCH repetition is type A or type B, or more generally, whether the channel repetition is of a first type or of a second type. Alternately (or in addition), the repetition type may be indicated in an allocated field in the Downlink Control Indication (DCI) used specifically to indicate the repetition type, or the indication may be embedded in the TDRA (Time Domain Resource Allocation) field in DCI. The repetition type may also be indicated via a Media Access Control (MAC) Control Element (CE). The RV (Redundancy Version) of the first repetition may be indicated by DCI, and the RV may then cycle through a specific order {e.g. 0, 2, 3, 1}.

Frequency Hopping

The reliability of channel reception and MBS coverage may also be increased through expanded frequency hopping support. Support for multiple hops may yield a wider overall bandwidth, thereby increasing reliability of channel repetition reception. Accordingly, the network (e.g. base station) may configure a specified number of frequency hops, e.g. two (2) hops or four (4) hops and frequency offset for channel repetition. In some aspects, at least two different types of hopping may be configured for the UE.

As proposed herein, frequency hopping may be implemented on a per-repetition basis. According to per-repetition frequency hopping, each copy of the repetition may be transmitted in a different respective frequency domain location. The frequency domain location of the first repetition may be selected/specified according to an indication in the Frequency Domain Resource Allocation (FDRA) field, and a frequency hopping offset may be added to that frequency for the other, corresponding repetitions. E.g., in case of four hops, the first repetition takes place in a first frequency location, the second repetition takes place in a second frequency location, the third repetition takes place in a third frequency location, and the fourth repetition takes place in a fourth frequency location, while the fifth repetition (if applicable) may then cycle back to take place in the first frequency location, and so on and so forth. Support may also be provided for inter-slot frequency hopping where the PDSCH in the same slot may be in the same frequency domain location whether the repetition is finished or not. However, whereas previously only a single repetition could occur within a given slot, as proposed herein, multiple repetitions may take place within the same slot.

Joint-Repetition Channel Estimation

In some aspects, the channel estimation accuracy may be increased to improve the channel decoding performance, e.g. the PDSCH decoding performance, by performing joint-repetition channel estimation. Each repetition includes a Demodulation Reference Signal (DMRS). Multiple repetitions therefore provide multiple DMRSs. The multiple DMRSs may be used together to improve the accuracy of the channel estimation. The UE may indicate its joint-repetition channel estimation capability to the network (e.g. to the base station). The base station may determine based on this indication whether or not to enable joint-repetition channel estimation. For repetition with joint-repetition channel estimation, the base station (e.g. gNB) may indicate the joint-repetition channel estimation window, e.g. a window may be two repetitions, and the UE may operate under the assumption that the same precoding (or precoder) is applied in the bundling window.

Intra-slot frequency hopping operation may be used in conjunction with joint-repetition channel estimation. For joint-repetition channel estimation of the transmission in each slot, the respective DMRS from several repetitions may be used for performing joint-repetition channel estimation. In some aspect, joint-repetition channel estimation may be performed for slot aggregation for frequency hops. Each hop for the inter-frequency hopping may occupy a configured number of slots. The channel. e.g. PDSCH, may be repeated in the configured slots, and the PDSCH transmission may be hopped to another frequency domain location and repeated in the configured slots. For example, for a total of 16 repetitions of MBS with 4 hops, the PDSCH repetitions may take place in 2 slots for each hop. The repetitions in the two slots may be used for the joint-repetition channel estimation.

Example Code for Increased MBS Reception Reliability

Resources allocated for MBS, e.g. for PDSCH transmission/reception and repetition, from a signaling perspective, are shown below by way of an exemplary code segment. The parameters shown below reflect (and correspond to) the proposed enhancements discussed above with respect to repetitions, frequency hopping, and joint-repetition channel estimation.

MBS-Config::=SEQUENCE {
. . .
group-commonPdsch-AggregationFactor ENUMERATED {n2, n4, n8, n16} OPTIONAL
dedicatedPdsch-AggregationFactor ENUMERATED {n2, n4, n8, n16} OPTIONAL
frequencyHopping ENUMERATED {per-repetition, interSlot} OPTIONAL pdsch-RepTypeIndicator SEQUENCE {pdsch-RepTypeA, pdsch-RepTypeB}OPTIONAL
frequencyHoppingOffsetLists SEQUENCE (SIZE (1 . . . 4)) OF INTEGER (1 . . . maxNrofPhysicalResourceBlocks-1) OPTIONAL
RepetitionNumbersInjointChannelEstimationWindow ENUMERATED {n1, n2, n4, n8} OPTIONAL
slotsInJointChannelEstimationWindow ENUMERATED {n0, n2, n4} OPTIONAL
}

Example of Repetition Across Slot Boundaries for PDSCH Reception Reliability

Figure 6:
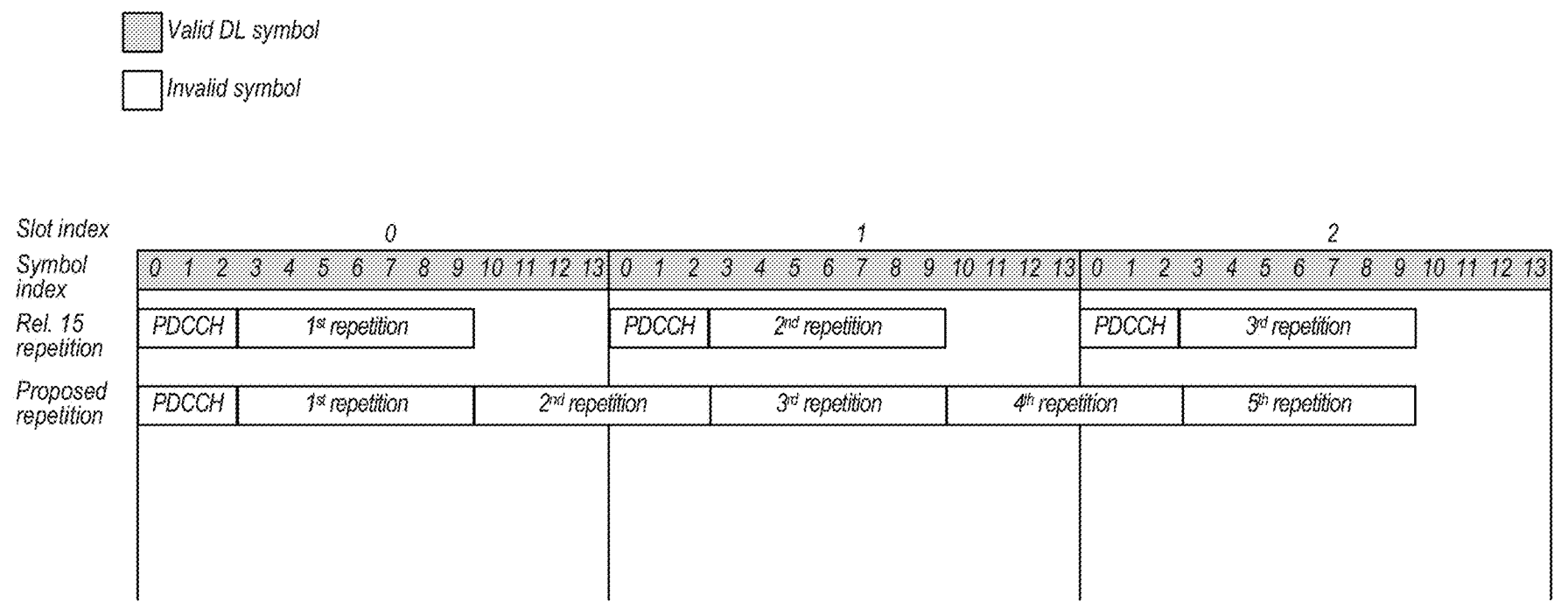

FIG. 6 shows the Rel.15 defined slot level repetition ("Rel.15 repetition") and a proposed repetition which allows repetitions to cross slot boundaries ("Proposed repetition). The example shown in FIG. 6 indicates the PDCCH transmission (indicated as "PDCCH"), and repetitions for PDSCH (indicated as "$1^{st}$ repetition", "$2^{nd}$ repetition" etc.) The length of PDSCH in the example is 7 symbols. Three slots are shown with 14 symbols per slot. In the Rel.15 scheme, the PDSCH transmits in symbol #3 through symbol #9 in each slot even if other symbols (e.g. symbols #10 through symbol #13) are available for data transmission. In the Rel. 15 repetition, those unused symbols cannot be used for repetition. In the Proposed repetition scheme, all available symbols may be used for repetition. Accordingly, the three illustrated slots accommodate 5 repetitions as opposed to only 3 repetitions, with the $2^{nd}$ repetition crossing the slot boundary between slot 0 and slot 1, and the $4^{th}$ repetition crossing the boundary between slot 1 and slot 2. In FIG. 6, all symbols are indicated as valid symbols for repetition.

Figure 7:
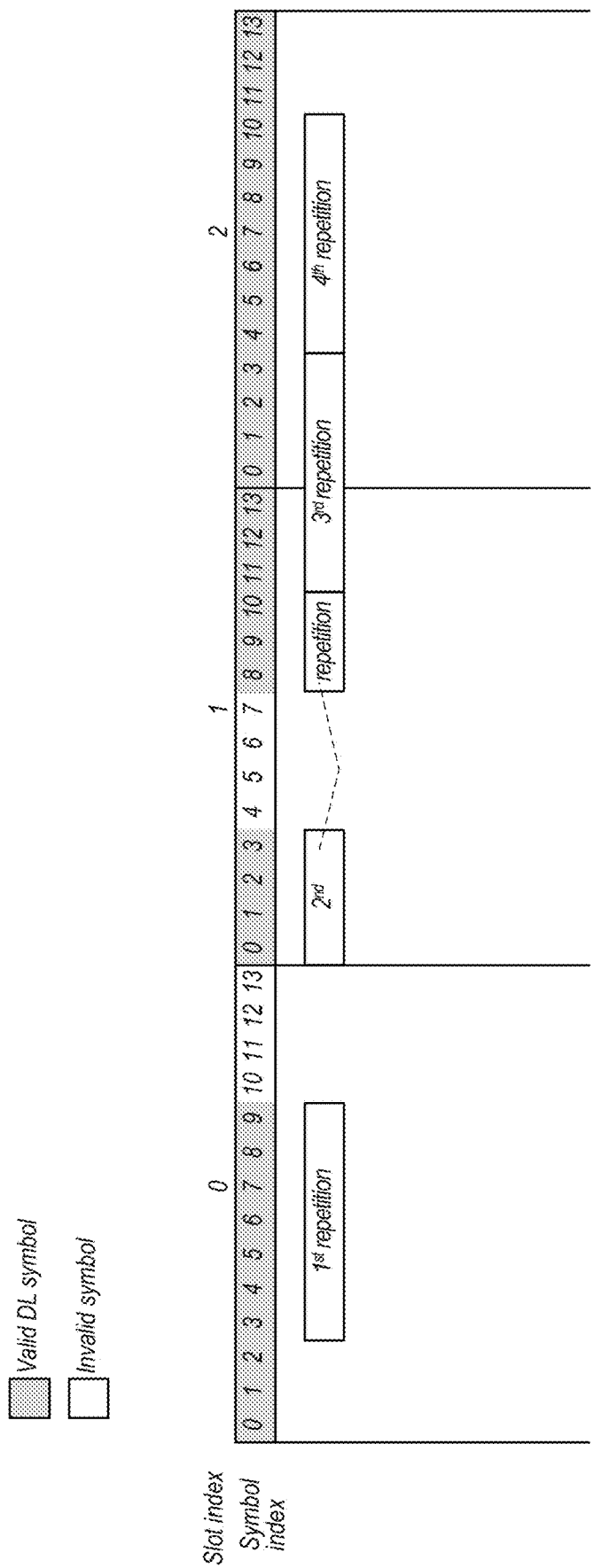
FIG. 7 shows a diagram illustrating group-common PDSCH repetition type B with invalid symbols, according to some aspects.

FIG. 7 provides an example of a proposed repetition scheme which includes invalid symbols. For example slot 0 is shown as a special slot in which symbols #10 to #13 are used for GP or UL transmission, and these symbols are therefore invalid symbols. Symbols #4 to #7 of slot 1 are occupied by an SSB transmission, and these symbols are therefore invalid symbols as well. The PDSCH repetition is skipping the invalid symbols but the length of each repetition remains the same. In this case the $2^{nd}$ repetition is therefore broken up by the invalid symbols, but the $2^{nd}$ repetition is still seven symbols in length, occupying symbols #0 to #3 and #8 to #10 of slot 1. One benefit of the repetition scheme illustrated in FIG. 7 is that the Transport Block (TB) coding process remains the same as for the other repetitions, and no additional implementation effort is required on the part of the UE.

Example of Frequency Hopping for PDSCH Reception Reliability

Figure 8:
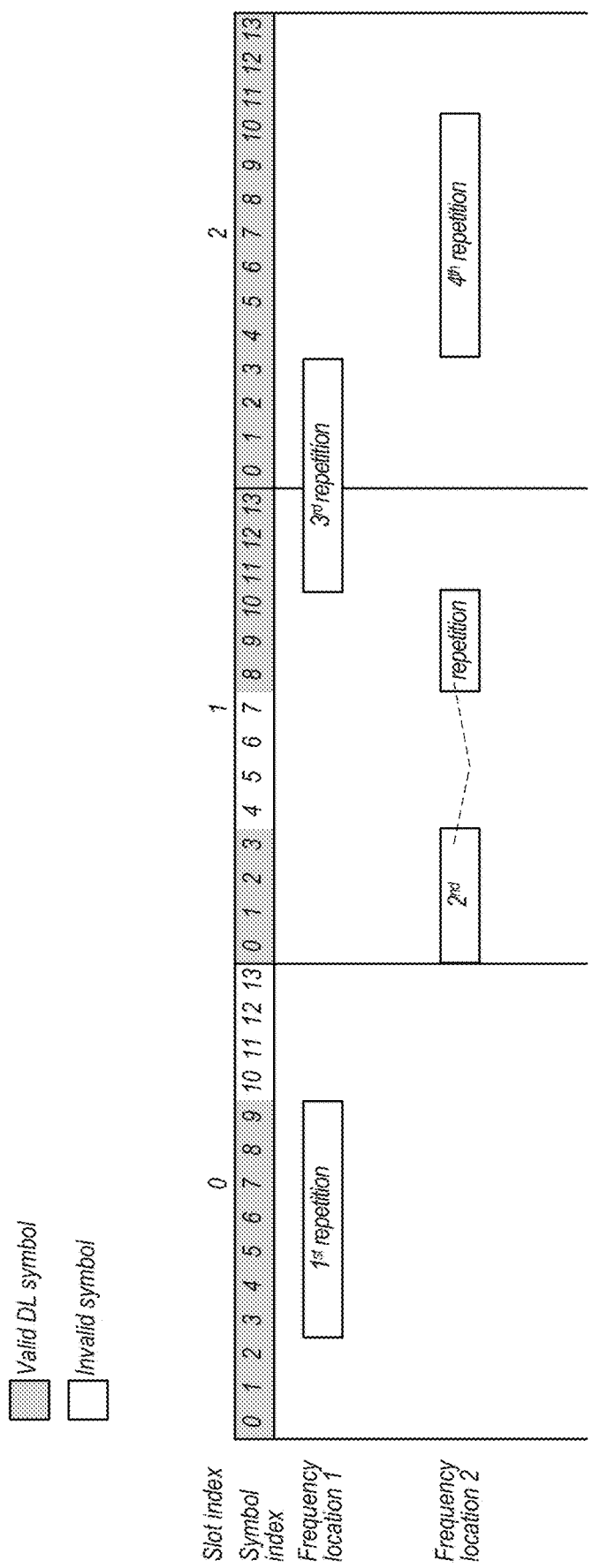
FIG. 8 shows a diagram illustrating PDSCH repetition with frequency hopping where the hopping granularity is per repetition, according to some aspects.
Figure 9:
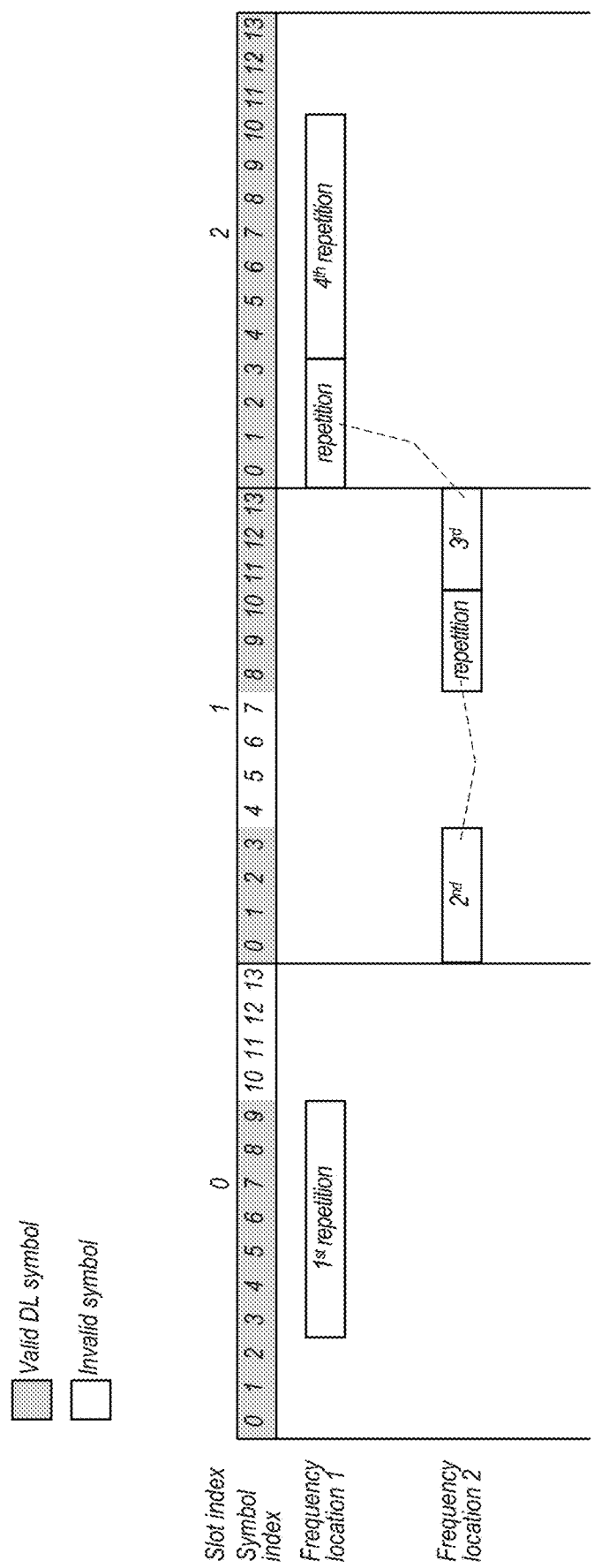
FIG. 9 shows a diagram illustrating PDSCH repetition with frequency hopping where the hopping granularity is per slot, according to some aspects.

FIG. 8 and FIG. 9 illustrate two different frequency hopping schemes based on what has been previously described above. FIG. 8 shows a diagram illustrating PDSCH repetition with frequency hopping where the hopping granularity is per repetition. As indicated, each repetition occupies different frequency domain resources, and even when the repetition is discontinuous it is still in the same frequency domain location. As shown in FIG. 8, symbols #10 to #13 of slot 0 and symbols #4 to #7 of slot 1 are invalid symbols for repetitions. The $1^{st}$ repetition and $3^{rd}$ repetition take place at a first frequency location (Frequency location 1) while the $2^{nd}$ repetition and $4^{th}$ repetition take place at a second frequency location (Frequency location 2). The $2^{nd}$ repetition is split by the invalid symbols in slot 1 but still occurs entirely in slot 1. Additionally, the $3^{rd}$ repetition also crosses the boundary between slot 1 and slot 2.

FIG. 9 shows a diagram illustrating PDSCH repetition with inter-slot frequency hopping where the frequency hopping granularity is defined by slot, and the repetitions in the same slot occupy the same frequency domain resources. As shown in FIG. 9, symbols #10 to #13 of slot 0 and symbols #4 to #7 of slot 1 are again invalid symbols for repetitions. The $1^{st}$ repetition and $4^{th}$ repetition, and a second portion of the $3^{rd}$ repetition take place at a first frequency location (Frequency location 1) while the $2^{nd}$ repetition and a first portion of the $3^{rd}$ repetition take place at a second frequency location (Frequency location 2). The $2^{nd}$ repetition is again split by the invalid symbols in slot 1 but still occurs entirely in slot 1. Additionally, the $3^{rd}$ repetition also crosses the boundary between slot 1 and slot 2.

Example of Joint-Repetition Channel Estimation for PDSCH reception reliability

Figure 10:
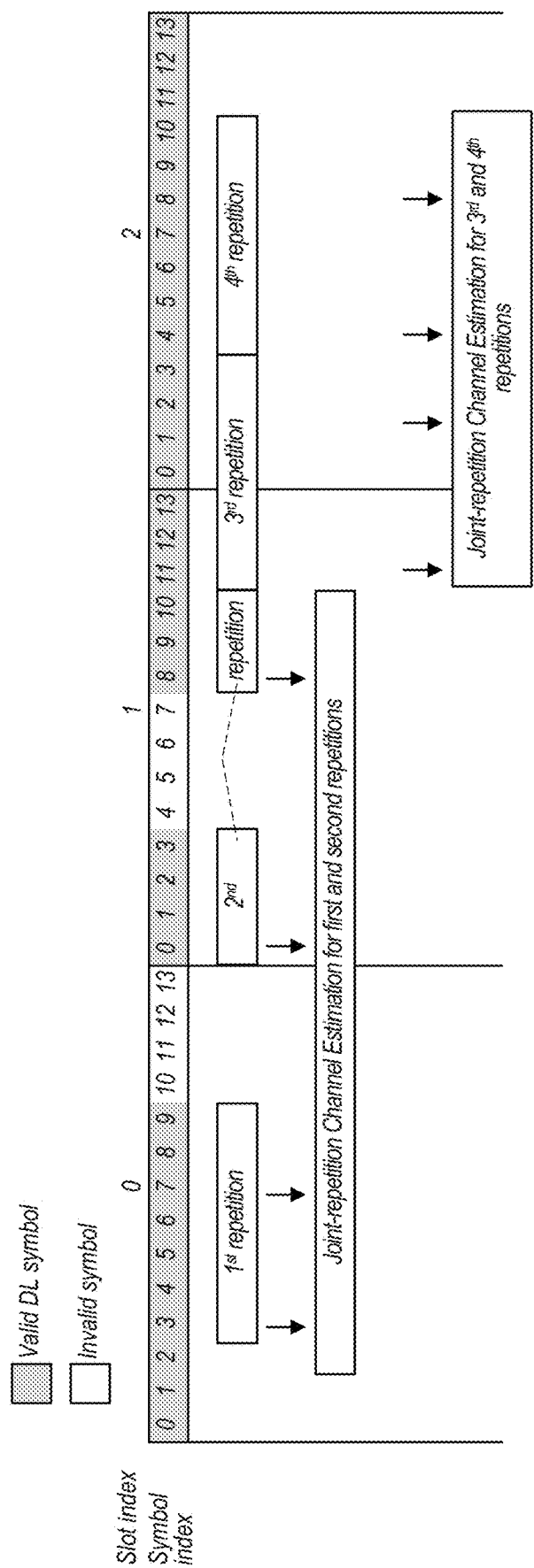
FIG. 10 shows a diagram illustrating PDSCH repetition with joint-repetition channel estimation, according to some aspects.

FIG. 10 shows a diagram illustrating PDSCH repetition with joint-repetition channel estimation. As shown in FIG. 10, the DMRSs from two repetitions are used for channel estimation. The base station (e.g. gNB) may indicate the joint-repetition channel estimation window, which in this example is two repetitions, with the UE operating under the assumption of the same precoding being applied in the bundling window. As shown in FIG. 10, symbols #10 to #13 of slot 0 and symbols #4 to #7 of slot 1 are again invalid symbols for repetitions. The 2nd repetition is again split by the invalid symbols in slot 1 but still occurs entirely in slot 1. Additionally, the $3^{rd}$ repetition crosses the boundary between slot 1 and slot 2. The DMRSs from the $1^{st}$ repetition and $2^{nd}$ repetition are used for performing joint-repetition channel estimation for the $1^{st}$ and $2^{nd}$ repetitions, while the DMRSs from the $3^{rd}$ repetition and $4^{th}$ repetition are used for performing joint-repetition channel estimation for the $3^{rd}$ and $4^{th}$ repetitions. Due to the resource elements (REs) for DMRS being doubled in each case, the channel estimation accuracy may be increased and the PDSCH performance may be thereby improved.

Figure 11:
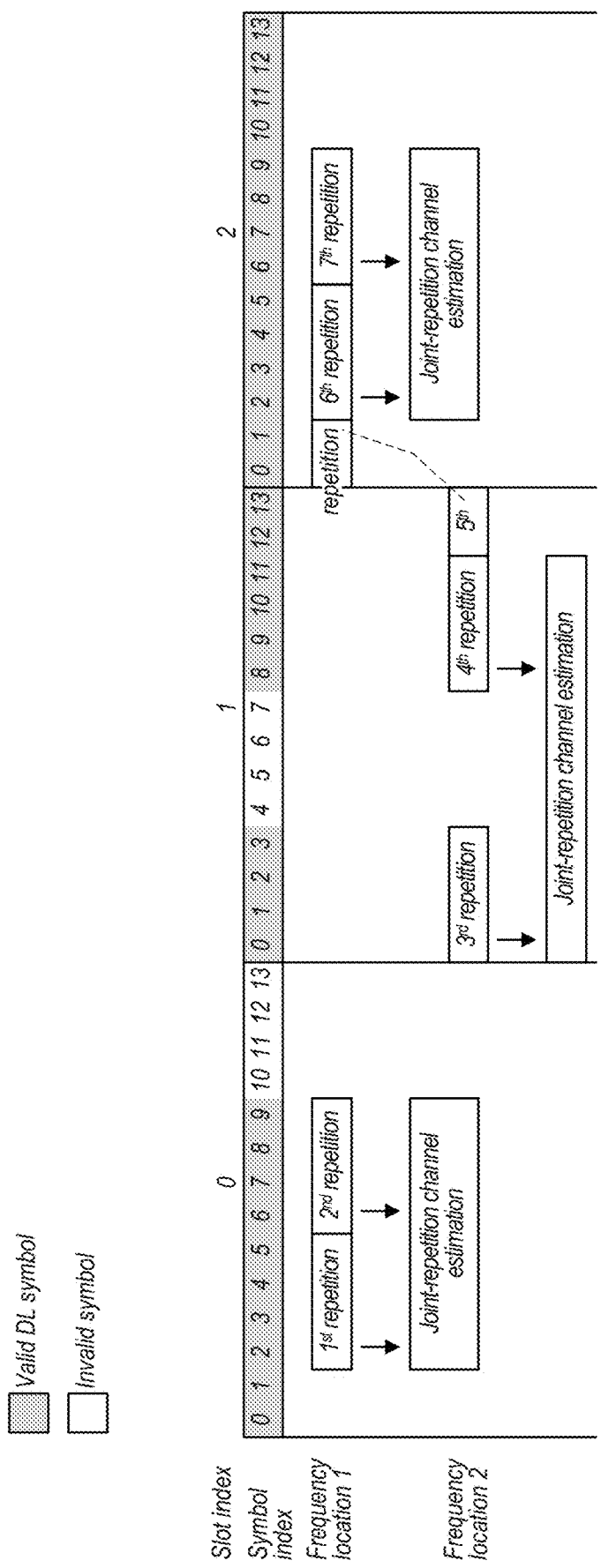
FIG. 11 shows a diagram illustrating PDSCH repetition with inter-slot frequency hopping and joint-repetition channel estimation, according to some aspects.

FIG. 11 shows a diagram illustrating PDSCH repetition with inter-slot frequency hopping and joint-repetition channel estimation. In the example in FIG. 11, each repetition is four symbols in length, and symbols #10 to #13 of slot 0 and symbols #4 to #7 of slot 1 are again invalid symbols for repetitions. The $1^{st}$ repetition, $2^{nd}$ repetition, a second portion of the $5^{th}$ repetition, and the $6^{th}$ repetition and $7^{th}$ repetition take place at a first frequency location (Frequency location 1) while the $3^{rd}$ repetition, $4^{th}$ repetition, and a first portion of the $5^{th}$ repetition take place at a second frequency location (Frequency location 2). Additionally, the $5^{th}$ repetition also crosses the boundary between slot 1 and slot 2. With joint-repetition channel estimation of the transmission in each slot, the DMRSs from several repetitions are used for joint-repetition channel estimation. The repetitions in the same slot are joint channel estimated, while for the repetition split into two frequency domain locations, the channel estimation is based on DMRS from a single repetition.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, in some aspects, the present disclosure may be realized as a computer-implemented method, a computer-readable memory medium, or a computer system. In other aspects, the present disclosure may be realized using one or more custom-designed hardware devices such as ASICs. In other aspects, the present disclosure may be realized using one or more programmable hardware elements such as FPGAs.

In some aspects, a non-transitory computer-readable memory medium (e.g., a non-transitory memory element) may be configured so that it stores program instructions and/or data, where the program instructions, if executed by a computer system, cause the computer system to perform a method, e.g., any of the methods described herein, or, any combination of the methods described herein, or, any subset of any of the methods described herein, or, any combination of such subsets.

In some aspects, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various methods described herein (or, any combination of the methods described herein, or, any subset of any of the methods described herein, or, any combination of such subsets). The device may be realized in any of various forms.

Any of the methods described herein for operating a user equipment (UE) or device may be the basis of a corresponding method for operating a base station or appropriate network node, by interpreting each message/signal X received by the UE in the downlink as message/signal X transmitted by the base station/network node, and each message/signal Y transmitted in the uplink by the UE as a message/signal Y received by the base station/network node.

Although the aspects above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
memory to store information; and
processing circuitry coupled with the memory and configured to interoperate with the memory to:
receive multiple repetitions of a physical channel as part of wireless communications within a wireless network, wherein at least one repetition of the multiple repetitions is a specified type of repetition that is continuous across a slot boundary between a first slot and a second slot in which the at least one repetition is received;
perform a channel estimation using reference signals from at least two different repetitions of the multiple repetitions for the channel estimation; and
provide information to a base station prior to performing the channel estimation, wherein the information indicates to the base station that the UE is capable of performing the channel estimation using the reference signals from at least two different repetitions of the multiple repetitions for the channel estimation,
wherein the channel estimation is performed responsive to joint-repetition channel estimation being enabled by the base station responsive to the information.

2. The apparatus of claim 1, wherein the physical channel is a physical downlink shared channel (PDSCH).

3. The apparatus of claim 1, the processing circuit further configured to interoperate with the memory to:
have information transmitted to a base station prior to reception of the multiple repetitions, the information indicating capability of receiving repetitions of the specified type.

4. The apparatus of claim 1, the processing circuit further configured to interoperate with the memory to have at least another repetition of the multiple repetitions received in a slot that includes invalid symbols not available for repetitions, wherein the other repetition does not use the invalid symbols in the slot while remaining of a same length as other repetitions of the multiple repetitions.

5. The apparatus of claim 4, wherein the invalid symbols include one or more of:
symbols that overlap with synchronization signal block transmissions;
symbols used for a physical downlink control channel;
guard period symbols;
uplink symbols;
symbols in a time division duplex uplink slot; or
symbols indicated as uplink symbols or guard period symbols by a slot format indicator.

6. The apparatus of claim 1, the processing circuit further configured to interoperate with the memory to have information received from a base station prior to reception of the multiple repetitions, wherein the information indicates that the multiple repetitions are of the specified type.

7. The apparatus of claim 6, wherein the indication is received in one or more of:
radio resource control signaling;
a specially allocated field in a downlink control indication;
a time domain resource allocation field in the downlink control indication; or
a media access control (MAC) control element.

8. A user equipment (UE) comprising:
radio circuitry configured to enable wireless communications of the UE; and
a baseband processor communicatively coupled to a memory element and configured to interoperate with the radio circuitry to:
receive, while wirelessly communicating within a wireless network, multiple repetitions of a physical channel, wherein at least one repetition of the multiple repetitions is a specified type of repetition that is continuous across a slot boundary between a first slot and a second slot in which the at least one repetition is received;
perform a channel estimation using reference signals from at least two different repetitions of the multiple repetitions for the channel estimation; and
provide information to a base station prior to performing the channel estimation, wherein the information indicates to the base station that the UE is capable of performing the channel estimation using the reference signals from at least two different repetitions of the multiple repetitions for the channel estimation,
wherein the channel estimation is performed responsive to joint-repetition channel estimation being enabled by the base station responsive to the information.

9. The UE of claim 8, wherein the baseband processor is configured to further interoperate with the radio circuitry to transmit, to a base station prior to receiving the multiple repetitions, information indicating that the UE is capable of receiving repetitions of the specified type.

10. The UE of claim 8, the baseband processor further configured to interoperate with the radio circuitry to:

receive each repetition of a subset of the multiple repetitions in a different respective frequency domain location of multiple frequency domain locations.

11. The UE of claim 10, wherein a first respective frequency domain location of the multiple frequency domain locations is specified according to an indication in a frequency domain resource allocation (FDRA) field.

12. The UE of claim 11, wherein remaining respective frequency domain locations of the multiple frequency domain locations are specified according to corresponding offsets added to the first respective frequency domain location.

13. The UE of claim 10, the baseband processor further configured to interoperate with the radio circuitry to receive more than one repetition of the subset of the multiple repetitions within a single slot.

14. A non-transitory memory element storing instructions executable by a processor to cause a user equipment (UE) to:
receive, while wirelessly communicating within a wireless network, multiple repetitions of a physical channel, wherein at least one repetition of the multiple repetitions is a specified type of repetition that is continuous across a slot boundary between a first slot and a second slot in which the at least one repetition is received;
perform a channel estimation using reference signals from at least two different repetitions of the multiple repetitions for the channel estimation; and
provide information to a base station prior to performing the channel estimation, wherein the information indicates to the base station that the UE is capable of performing the channel estimation using the reference signals from at least two different repetitions of the multiple repetitions for the channel estimation,
wherein the channel estimation is performed responsive to joint-repetition channel estimation being enabled by the base station responsive to the information.

15. The non-transitory memory element of claim 14, the instructions further executable by the processor to: perform the channel estimation based on a channel- estimation window defined by a number of repetitions.

16. The non-transitory memory element of claim 15, the instructions further executable by the processor to:
receive an indication of the channel-estimation window from a base station.

17. The non-transitory memory element of claim 14, the instructions further executable by the processor to: perform the channel estimation for slot aggregation for frequency hops.

* * * * *